United States Patent Office 3,242,205
Patented Mar. 22, 1966

3,242,205
SPIRO-DI-o-XYLYENE, PROCESS FOR PREPARING SAME AND DIELS-ALDER ADDUCTS THEREOF
Louis A. Errede, Roseville, Minn., assignor to Minnesota Mining and Manufacturing Company, St. Paul, Minn., a corporation of Delaware
No Drawing. Filed Dec. 2, 1959, Ser. No. 856,647
3 Claims. (Cl. 260—475)

This invention relates to a new and useful class of compounds containing a reactive methylene group and to their method of preparation. These compounds contain the nucleus

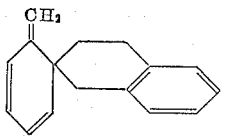

The class of compounds encompassed in this invention undergo various conventional and unique reactions. For instance, they may be reduced with hydrogen, reacted with halogens, inorganic acids, organic acids, alcohols and phenols. They may be copolymerized with ethylenically unsaturated compounds, sulfur dioxide, trivalent phosphorus compounds, and para-quinodimethanes.

The term "quinodimethane" as used herein means an organic compound having a di-unsaturated 6-membered cyclic nucleus having each of 2 carbon atoms of the di-unsaturated ring doubly bonded to the carbon atom of a methylene group, that is

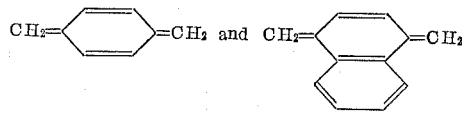

and heterocyclic compounds derived therefrom by the substitution of from 1 to 2 carbon atoms of one ring by trivalent nitrogen in non-adjacent positions and the methyl and halogen nuclear substituted compounds said halogen being a normally non-gaseous halogen and isomers thereof.

They may also be homopolymerized to form polymers useful for protective coatings and encapsulating electrical components. For instance, the compound prepared from ortho-xylene may be polymerized to polyortho-xylylene.

One method for preparing the compounds of this invention which contain at least three cyclic rings with a reactive methylene group is to destructively distill compounds containing the nucleus

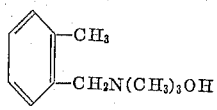

and to condense the vapors in an organic liquid maintained at below —45° C.

These compounds can also be prepared by the dimerization of two ortho-quinodimethanes.

This invention may be illustrated further by reference to the following examples in which all "parts" are expressed as parts by weight and all "percentages" are expressed as percent by weight, unless otherwise specified.

EXAMPLE 1

Preparation of spiro-di-o-xylylene
(hereafter designated SDOX)

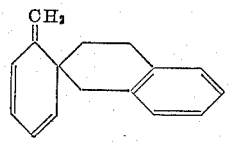

(a) Preparation of o-xylyltrimethylammonium hydroxide.

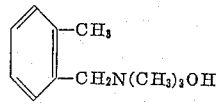

A slow stream of gaseous trimethyl amine was metered over the surface of a vigorously stirred solution of o-xylyl bromide (300 grams) in three liters of ether contained in a 5 liter round bottom flask fitted with a reflux condenser, a stirrer, and inlet tube. The reaction was carried out at room temperature over a period of three hours. At the end of this time the white precipitate was removed by filtration. The mother liquor was retreated with gaseous trimethyl amine and a small amount of newly formed precipitate was removed by filtration, and combined with the first precipitate. The total yield of o-xylyltrimethylammonium bromide was 384.

A small sample was recrystallized from ethyl acetate-methanol solution and o-xylyl trimethylammonium bromide it was obtained in the form of white needles (melting point 214° C.). Its elemental analysis was as follows:

| Percent by weight | Carbon | Hydrogen | Nitrogen | Bromine |
|---|---|---|---|---|
| Theoretical for $C_{11}H_{18}NBr$ | 54.12 | 7.41 | 5.73 | 32.74 |
| Found | 54.1 | 7.4 | 5.69 | (a) 32.9 (b) 32.5 |

A portion of the unrecrystallized white powder (277 grams) was dissolved in distilled water (350 cc.) and this solution was added to $Ag_2O$ (200 grams, 0.86 mole) suspended in 350 cc. of water in a one liter three necked round bottom flask fitted with a stirrer, immersion thermometer, heating mantle, and an ascarite capped reflux condenser. The temperature of the stirred slurry rose from 22° C. to 55° C. and mixture was kept at 55° C. for an additional 5 hours. The mixture was cooled to room temperature and a finely divided suspension was separated by means of a centrifuge. The amber supernatant liquid was concentrated under vacuum to a concentration of 2.5 moles per liter.

In this way 2.1 liters of aqueous 2.5 molar o-xylyl trimethylammonium hydroxide were prepared batchwise from 1.3 kilograms of quaternary salt.

(b) *Destructive distillation of o-xylyl trimethyl-ammonium hydroxide.*—A decomposition apparatus was assembled which consisted of a one liter two necked round bottom flask equipped with a heating mantle, steam heated condenser, closed at one end by a 2 millimeter stopcock, and a gooseneck which led to a second one liter two necked flask chilled in a Dry Ice-acetone bath. The system was evacuated to 5–20 millimeters and an aqueous solution of o-xylyltrimethylammonium hydroxide (2.5 moles) was metered into the system at the rate of 1–3 cc. per minute through the stopcock at the top of the steam heated condenser. The solution was concentrated rapidly as it cascaded down the steam heated condenser and was decomposed by flash distillation in the first one liter flask heated to about 150–200° C., and the volatile compounds were condensed in the one liter flask kept at −78° C.

When the predetermined amount of quaternary base was decomposed the system was equilibrized to atmospheric pressure. The cold flask was filled with 50% HCl and then warmed rapidly to room temperature resulting in a two-phased liquid system, which was separated by ether extraction. The ether extract was evaporated to constant weight at room temperature under a vigorous stream of air. About 1 gram of oil was obtained per gram of 2.5 molar aqueous quaternary base metered to the system. In this way 80 grams of oil were accumulated from 711 grams of solution.

After one week in a freezer, white needle-like crystals formed throughout the oil and these were separated by cold filtration at −20° C. and the filter cake (24 grams) was recrystallized twice from heptane to yield large colorless crystals of cyclo-di-o-xylylene (melting point 112.0–112.5° C.). The oily mother liquor (55 grams) was dissolved in 1 liter of heptane and a small amount of insoluble polymer was separated by filtration. The clear solution was passed through a column (3 feet long, ¾ inch in diameter) filled with one-half pound of neutral $Al_2O_3$. SDOX ($n_D$ 26.5=1.5998, 1.5972, 1.5976) was eluted from the column in the first seven 250 cc. fractions (total weight 41.29). Di-o-xylyl ether (3.7 grams) was obtained in fractions 8 to 13. Benzene in increasing mole fraction was added to the heptane and 2.4 grams of an ester were obtained in fractions 14 to 24. Ether in increasing mole fraction was added to the benzene and 1.4 grams of o-xylyl alcohol were obtained in fractions 25 to 28. Finally methanol was added to remove an additional 0.9 gram of an unsaturated alcohol in fractions 29 to 35.

EXAMPLE 2

*Hexahydro-spiro-di-o-xylylene from SDOX*

SDOX (3 grams), 0.5 gram Raney nickel and 20 cc. heptane were placed in a hydrogenation bomb at room temperature and the pressure was raised to 1000 p.s.i.g. The hydrogenation reaction was allowed to occur at room temperature for 3 hours; thereafter, the temperature was raised to 50° C. for an additional 15 hours. The suspension of Raney nickel in heptane solution was separated by filtration and the filtrate was evaporated to dryness (3.0 grams). The residual oil was purified by distillation at 0.6 to 0.8 millimeter Hg pressure (boiling point=115–120° C., $n_D$ 27°=1.5558), and found to contain 90.2% carbon and 9.8% hydrogen. Infrared and nuclear magnetic resonance spectra confirmed the structure to tbe spiro-[5,5]-3-benz-6-methyl-cyclane.

EXAMPLE 3

*Maleic anhydride adduct of SDOX*

SDOX (5 grams, 0.027 mole) dissolved in 10 cc. of benzene were added dropwise at reflux temperature to maleic anhydride (6 grams, 0.06 mole) in 15 cc. of benzene. The resulting solution was allowed to react at reflux temperature for an additional 16 hours. The benzene was separated by distillation. The residual oil was dissolved in 200 cc. of 15% sodium hydroxide and the non-acidic components were separated by extraction with ether. The aqueous alkaline solution was acidified with hydrochloric acid, re-extracted with ether and the ether extracted evaporated to dryness leaving 4.6 grams of a brown oil as residue which solidified to a resinous mass. This was leached with hot water to remove residual maleic anhydride. The residue was dried and ground to a fine powder (melting point 85–90° C.). No improvement in melting point range was noted by recrystallizing from hot water or water-methanol solution. Its neutral equivalent of 166 and molecular weight of 307 show that the compound is the one to one adduct of maleic anhydride and SDOX. The infrared and nuclear magnetic resonance spectra indicated a 1,4-addition (Diels-Alder adduct) across the endo diene-7,9 system of SDOX.

EXAMPLE 4

(a) *2,2'-di-iodomethyldibenzyl from SDOX.*—A solution of SDOX (1 gram) in 20 cc. carbon tetrachloride was added dropwise at room temperature to iodine (1.35 grams) dissolved in 200 cc. of carbon tetrachloride. The color of the solution changed almost immediately from the characteristic iodine in carbon tetrachloride color to a brick red solution which slowly became colorless. The resulting mixture was concentrated at room temperature under a stream of air to 25 cc., and the precipitate (melting point 162–164° C.) formed thereby was separated by filtration (2.2 grams). The product was recrystallized from carbon tetrachloride in the form of coarse white needles (melting point 166–168° C.) which contained 41.6% carbon, 3.7% hydrogen and 53.9% iodine. The infrared and nuclear magnetic resonance spectra confirmed the resulting compound to be 2,2'-di-iodomethyl dibenzyl.

(b) *2,2'-dimethyldibenzyl from 2,2'-diiodomethyldibenzyl.*—2,2'-diiodomethyldibenzyl (5 grams) was added to a mixture of 75 cc. methanol and 5 grams of zinc dust. The mixture was allowed to react at reflux temperature for one hour. The excess zinc was removed by filtration and the mother liquor was added to an excess of water. The resulting copious white precipitate was collected by filtration and was recrystallized from a minimum amount of alcohol in the form of white crystals (melting point 61–63° C.). The melting point of a mixture of this compound with 2,2'-dimethyldibenzyl was 62–63° C. The infrared spectra of the recrystallized product and that of a known sample of 2,2'-dimethyldibenzyl were identical.

(c) *2,2-diiodomethyldibenzyl from 2,2'-bromomethyldibenzyl.*—A mixture of 0.5 gram of 2,2'-dibromomethyldibenzyl (melting point 140–141 C.) and 2 grams potassium iodide in acetone was warmed on a steam bath for one hour. The resulting mixture was separated by filtration and the collected precipitate was recrystallized from carbon tetrachloride to yield di(iodomethyl)dibenzyl (melting point 163–165° C.). The melting point of the resulting mixture was not depressed when the compound was mixed with the diiodide sample prepared directly from SDOX as in (a) above.

(d) *2,2'-dibromomethyldibenzyl from SDOX.*—Two grams of SDOX in carbon tetrachloride were added to an excess of bromine (2 cc.) at room temperature. The carbon tetrachloride was removed by evaporation to dryness and the residue was recrystallized from methanol to yield needle-like crystals of di-bromomethyldibenzyl (melting point 133–138° C.). The compound was recrystallized from heptane in the form of white needles (melting point 140–141° C.).

EXAMPLE 5

*Polymerization of SDOX to poly-o-xylylene*

SDOX (1 cc.) was placed in a screw cap vial, flushed with nitrogen and sealed. Polymerization at 100° C. over a 48 hour period produced a tough transparent product that softened at about 100° C. The product was dissolved in 125 cc. of benzene. This solution was concentrated to 20 cc., and polymer was reprecipitated by dropwise addition to one liter of vigorously stirred methanol. The plastic rubbery mass was dried at 53° C. in a vacuum oven for 24 hours. The polymer was pressed at 100° C. and 1000 p.s.i.g. pressure into a clear transparent tough film useful as a protective coating. Its intrinsic viscosity was 0.33 which corresponds to a molecular weight of 13,000 using natural rubber as a reference or 59,000 using polystyrene as a reference. The glass transition was determined to be +9° C. and the index of refraction at this temperature was 1.629. The slope of index refraction to temperature is $-3.43 \times 10^{-4}$ at $T > Tg$ and $-1.35 \times 10^{-4}$ at $T < Tg$.

EXAMPLE 6

Copolymerization of SDOX with various monomers

In the following experiments SDOX dissolved in a comonomer was sealed under vacuum in a 10 cc. ampoule and was placed in a tumbling bath where polymerization was allowed to occur for 7 days at the temperature indicated. (A mutual solvent was used occasionally as indicated.) The excess solvent was removed by distillation and the residue was dissolved in a minimum amount of benzene which was added dropwise to a twenty-fold amount of methanol. The insoluble polymer was redissolved in a minimum amount of benzene and then reprecipitated by dropwise addition to a 20-fold amount of methanol. The polymer was baked at 100° C. for 1 hour, then dried in a vacuum oven overnight at 50° C. (Where practicable, the soluble products were recovered from the mother liquor by evaporation to dryness.)

(a) *With styrene.*—A solution of SDOX (3 grams) in styrene (5 cc.) was polymerized at 50° C. over a period of 7 days to afford 2.5 grams polymer whose intrinsic viscosity was 0.380. The X-ray pattern shows the product is amorphous with a diffuse halo at 5.1 A. The polymer was pressed into a clear transparent sheet that embrittled below room temperature.

(b) *With 3-chlorostyrene.*—A solution of SDOX (2.6 grams) and 3-chlorostyrene (2.6 grams) in 10 cc. of hexane was polymerized at 50° C. for 7 days to afford a polymer (2 grams) that contained 13.5% Cl. This corresponds to a di-o-xylylene to 3-chlorostyrene ratio of 0.60 to 1. Its inherent viscosity was 0.642. The polymer was pressed at 120° C. and 500 p.s.i.g. into a clear tough pliable transparent sheet. Its infrared spectrum shows the presence of aromatic groups with both ortho and meta substituents.

(c) *With methylmethacrylate.*—A solution of SDOX (3 grams) in methylmethacrylate (5 cc.) was polymerized at 50° C. for 7 days to produce an amorphous polymer whose elemental analysis was 80.4% C. and 7.9% H. This corresponds to a di-o-xylylene to methylmethacrylate ratio of 0.67 to 1. Its inherent viscosity was 0.439. Its X-ray pattern had a diffuse halo at 5.2 A. The product could be pressed at 100° C. and 500 p.s.i.g. into a clear transparent sheet.

(d) *With n-octylacrylate.*—A solution of SDOX (2.5 grams) in n-octylacrylate (5 cc.) was polymerized at 50° C. for 7 days to afford an amorphous polymer (1.7 grams). Its inherent viscosity was 0.270 and elemental analysis was 85.6% carbon and 8.3% hydrogen. This corresponds to a di-o-xylylene to n-octylacrylate ratio of 1.7 to 1. The product was a clear transparent elastomer.

(e) *With butadiene.*—A solution of SDOX (2.7 grams) in butadiene (5 cc.) was polymerized at 55° C. for 3 days and an additional 2 days at 100° C. to afford 2.1 grams of a clear transparent elastomer having an inherent viscosity of 0.309 and elemental analysis was 88.8% carbon and 8.7% hydrogen. This corresponds to a di-o-xylylene to butadiene ratio of 0.62 to 1. Its infrared curve indicates a linear copolymer structure with 1-4 and 1-2 addition to butadiene. Its X-ray pattern shows that the product is amorphous with a diffuse halo at 5.1 A.

(f) *With isoprene.*—A solution of SDOX (2.8 grams) in isoprene (7 cc.) was polymerized at 55° C. for 5 days at 100° C. to afford 2.8 grams of a clear transparent elastomer having an inherent viscosity of 0.321 and an elemental analysis of 88.4% carbon and 9.3% hydrogen, corresponding to a di-o-xylylene to isoprene ratio of 0.51 to 1. Its X-ray pattern shows that the product is amorphous with a diffuse diffraction halo at 5.1 A.

(g) *With tetrafluoroethylene.*—(1) A mixture of SDOX (2.7 grams) and tetrafluoroethylene (40 grams) was dispersed in an emulsion system composed of 150 cc. $H_2O$, $C_7F_{15}CO_2NH_4$ (1.59 grams), $(NH_4)_2B_4O_7$ (0.75 gram), $(NH_4)_2S_2O$ (0.75 gram), and was polymerized in an Aminco bomb at 50° C. for 2 days to afford a benzene soluble polymer containing 4.9% fluorine corresponding to a di-o-xylylene to tetrafluoroethylene ratio of 9 to 1.

(2) A mixture composed of SDOX (3.5 grams), tetrafluoroethylene (3 grams), 6 cc. of an emulsification recipe, containing 10.9 parts $C_7F_{15}CO_2H$, 1.5 parts KOH, 7.5 parts $K_2HPO_4$ and 500 parts water, and 3 c. catalyst solution containing 500 parts water and 7.5 parts $K_2S_2O_8$, was sealed under vacuum in a 25 cc. ampoule. This was placed in a continuous rocker and reacted at 40° C. for 48 hours. Two phases were still present, namely an emulsified aqueous layer and an organic layer. These were separated by decantation. The organic layer (2 grams) was dissolved in a minimum amount of benzene and reprecipitated by dropwise addition to a 10-fold excess of methanol. The insoluble polymer was dried and was found to contain 1.8% fluorine which corresponds to a di-o-xylylene to tetrafluoroethylene ratio of 20 to 1. The emulsion layer was coagulated and a polymer containing 9.0% fluorine and 80.1% carbon which corresponds to a di-o-xylylene to tetrafluoroethylene ratio of 3.6 to 1 was recovered.

(h) *With phenylisocyanate.*—A solution of SDOX (2.5 grams) in phenylisocyanate (5 cc.) was polymerized at 50° C. for 7 days to afford 1.1 grams polymer. Its infrared curve shows the presence of carbonyl and —NH— bonds.

(i) *With $PCl_3$.*—A solution of SDOX (3 grams) in $PCl_3$ (5 cc.) was polymerized at 50° C. for 10 days. The excess $PCl_3$ was removed by vacuum distillation. The residue was leached with methanol leaving an insoluble residue whose infrared curve is consistent with the following structure:

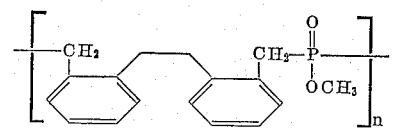

The methanol solution was chilled to $-78°$ C. to yield a product whose infrared curve was substantially identical to that of isoluble polymer.

The mother liquor was evaporated to dryness leaving a residue which contained 1.98% P and had an average molecular weight of 263.

EXAMPLE 7

Reaction of SDOX with $CF_3NO$

A mixture of 5 grams (0.02 mole) SDOX and 1.7 grams (0.02 mole) $CF_3NO$ was sealed at $-78°$ C. in a 25 cc. ampoule. This ampoule was warmed to room temperature and the heterogeneous reaction was allowed to occur at room temperature with continuous rocking for 3 days. During this time the characteristic blue color associated with $CF_3NO$ disappeared. The reaction mixture was dissolved in ethyl ether. The ether solution was evaporated to dryness and redissolved in heptane. The resulting solution was chilled to $-78°$ C. to afford 1 gram of a white solid (melting point 130–140° C.), containing 66.7% carbon, 4.38% nitrogen and 18.4% fluorine. Its molecular weight was 311. The product was recrystallized from a methanol-water mixture to afford fine white needles (melting point 142.5–143.0° C.), whose infrared spectrum and nuclear magnetic resonance spectrum showed the product to be a 1–4 addition of the NO group across the conjugated system of the ring in SDOX to which the methylene group is attached.

EXAMPLE 8

*Reaction of SDOX with acetylene-dimethyl carboxylate*

A solution of SDOX (6 grams) in acetylene dimethyl carboxylate (10 grams) was allowed to react at room temperature for two days and the resulting products separated by distillation at 0.17 mm. Hg pressure. The fraction having a boiling point of 182–185° C. was crystallized from methanol and then from heptane to afford fine white needles (melting point 123–124° C.). Upon analysis this product was found to contain 75.1% carbon and 6.2% hydrogen and had a molecular weight of 350. Its infrared spectrum and nuclear magnetic resonance showed the product to be

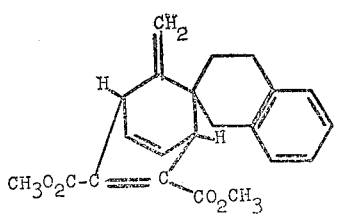

Hydrogenation of this compound dissolved in benzene for 16 hours by molecular hydrogen using a Raney nickel catalyst produced the product

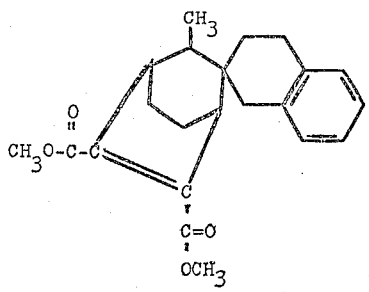

EXAMPLE 9

*Reaction of SDOX with maleic anhydride*

SDOX (0.04 mole) was admixed with 8 grams of maleic anhydride at about 53° C. An exothermic reaction occurred and the temperature rose to about 70° C. After cooling to room temperature, the resulting solution was leached with dilute sodium hydroxide. The alkaline solution was acidified with dilute hydrochloric acid to afford a tacky insoluble product which slowly solidified (melting point 70–85° C.). This was redissolved in dilute base and reprecipitated by acidification to again afford a tacky product (5.6 grams) which slowly solidified. The infrared spectrum indicated that it was a mixture of free acid and anhydride adducts. A small sample was aged at 80° C. for 20 minutes to convert the mixture to the anhydride, which melted at 95–97° C.

A sample of the mixture (1 gram) was dissolved in 50 cc. methanol to which 4 drops sulfuric acid were added. The solution was kept at reflux temperature for two days to convert the mixture to the corresponding ester which was recovered by evaporating to dryness. The residue was dissolved in carbon tetrachloride, washed with water, dried and evaporated to dryness leaving an amber oil as residue containing 74.5% carbon and 7.1% hydrogen. The infrared spectrum and nuclear magnetic resonance spectrum showed the ester to be

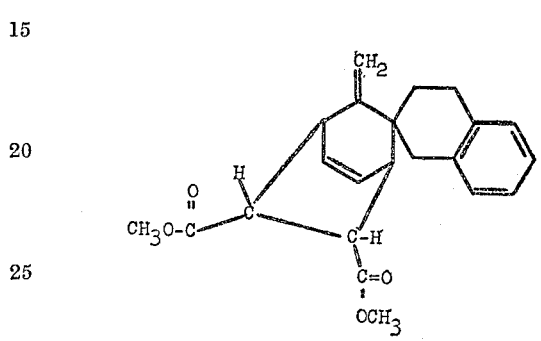

EXAMPLE 10

*Reaction of SDOX with nitric oxide*

A stirred solution of SDOX (6 grams) in 100 cc. methanol was allowed to react at room temperature with 5 liters of nitric oxide gas at atmospheric pressure in a closed system for two days. The excess solvent was removed by evaporation and the residue was dissolved in ethyl ether and washed with aqueous sodium hydroxide. The aqueous solution was acidified with dilute hydrochloric acid and extracted with ethyl ether. The ether extract was evaporated to dryness leaving an oil as residue. Its infrared spectrum showed that the oil was an aromatic oxime whose elemental analysis (7.34% nitrogen) and molecular weight of 378 correspond to a one to one mixture of the compounds

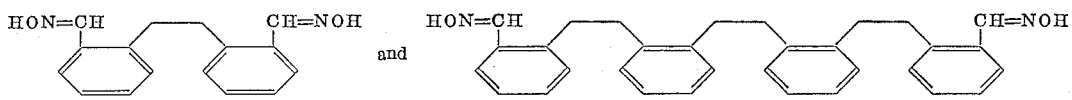

EXAMPLE 11

*Di-o-xylyl halide from SDOX*

A solution of SDOX (7 grams) in 100 cc. of anhydrous ether was added dropwise to 400 cc. of anhydrous ethyl ether saturated with hydrochloric acid. The resulting solution was kept at room temperature for 4 days and then the solvent was removed by evaporation. The residue was separated by vacuum distillation at 0.25 mm. Hg to afford 5.8 grams of di-o-xylylchloride (boiling point$_{0.25}$=122–126° C.; melting point=65–66° C.).

The use of hydrobromic acid in the above procedure affords di-o-xylyl bromide (melting point 70.5–72.0° C.; boiling point$_{0.8\ mm.}$ 152–160° C.).

EXAMPLE 12

Di-o-xylyl trifluoroacetate from SDOX

SDOX (5.8 grams) dissolved in 20 cc. heptane was added dropwise over a period of 20 minutes to 50 cc. of $CF_3CO_2H$ and 20 cc. of heptane. The mixture was agitated vigorously at room temperature until a homogeneous, clear, slightly fluorescent, green solution was obtained. The solution was allowed to remain at room temperature for two days. The excess solvent was then removed by evaporation and the residue was separated by distillation at 0.45 mm. Hg pressure. The main fraction (4.9 grams; boiling point, 130–136° C.), contained 13.3% fluorine and had an average molecular weight of 293. Its infrared spectrum and nuclear magnetic resonance spectrum showed the product to be a mixture of di-o-xylyl trifluoroacetate and di-o-xylyl ether.

EXAMPLE 13

Reaction of SDOX with methanol using hydrochloric acid as catalyst

A solution of SDOX (7.0 grams) in 200 cc. methanol containing 3 drops of concentrated hydrochloric acid was allowed to react at reflux temperature for 3 hours and then an additional 4 days at room temperature. The excess methanol was removed by distillation at atmospheric pressure leaving a residue of 6.5 grams which was separated by distillation at 0.15 mm. Hg to afford two fractions (1) 5.09 grams (boiling point 120–126° C.; $N_D^{24}$=1.5661) and (2) 0.9 gram residue. The infrared spectrum and nuclear magnetic resonance spectrum of the distillate showed it to be di-xylyl methyl ether.

EXAMPLE 14

Reaction of SDOX with phenol (a) *In dilute phenol solution.*—A solution of SDOX (10 grams) in 50 cc. heptane was added to 25 grams phenol dissolved in 500 cc. heptane and the resulting mixture was allowed to react at room temperature for 3 days. The excess heptane was removed by distillation at atmospheric pressure. The residue was separated by vacuum distillation at 1 mm. Hg pressure to afford 4 distillation fraction (1) 14 grams phenol (boiling point 47° C.), (2) 4.7 grams (boiling point 130–138° C.), (3) 4.59 grams (boling point 195–196° C.) and (4) 3 grams residue. Fraction (2) was leached with dilute sodium hydroxide leaving 2.0 grams 1-methyl-dibenzo-(a,d)-cyclo-hepta-(1,4)-diene (melting point 68.5–69.5° C. after one recrystallization from MeOH). The aqueous alkaline extract was acidified with dilute hydrochloric acid to afford a phenolic oil whose infrared curve showed it to be a low molecular weight polymer of the structure

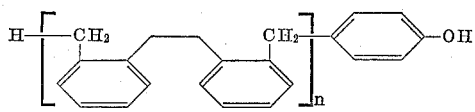

Fractions 3 and 4 were similar polymers of higher molecular weight.

(b) *In concentrated phenol solution.*—The above experiment was repeated with the modification that 5.8 grams SDOX in 10 cc. pentane were added to 25 grams phenol in 10 cc. pentane to afford a phenolic telomer mixture in 86% yield.

EXAMPLE 15

Copolymerization of SDOX and formaldehyde

A sample of paraformaldehyde was decomposed thermally at atmospheric pressure and the vapor was condensed at −78° C. into 100 cc. hexane in which 2.5 grams SDOX were dissolved. The solution was warmed to room temperature and the reaction was continued for an additional seven days. The insoluble precipitate formed thereby was removed by filtration and then leached with benzene. The extract was concentrated to 20 cc. and this was added dropwise to a 20 fold excess of methanol to afford 0.5 gram of polymer whose infrared spectrum and elemental analysis (77.0% carbon; 6.6% hydrogen) and molecular weight of 1600 indicating the presence of o-xylylene and formal units in the approximate ratio of 1 to 3, respectively.

EXAMPLE 16

Preparation of 1-methyl-dibenzo-(a,d) cyclohepta (1,4)-diene from SDOX

SDOX (5 grams) dissolved in 50 cc. hexane was added dropwise over a period of one hour to a cold (0° C.) solution of $CF_3CO_2H$ (25 cc.) in hexane (250 cc.). The reaction mixture was warmed to room temperature and the solvent removed by evaporation. The residue was fractionated and found to contain 70% 1-methyl-dibenzo-(a,d) cyclohepta (1,4)-diene (melting point 67.5–68.5° C.).

Polymers prepared in accordance with the teachings of this invention may be employed as films, protective coatings, gaskets, tubing, electrical insulators requiring high thermal and chemical stability, and other well-known applications.

The Diels-Alder adducts are useful as dye intermediates and modifiers in condensation polymerization reactions, especially the di-functional adducts.

I claim:
1. The compound

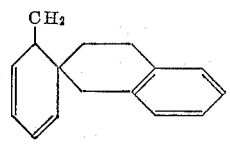

2. A process for preparing spiro-di-o-xylylene which comprises destructively distilling the compound

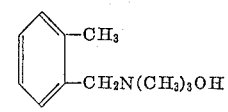

and condensing the vapors at a temperature below −45° C., and warming the condensed produce to produce spiro-di-o-xylylene.

3. Diels-Alder adducts of the compound

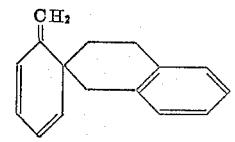

and a compound selected from the group consisting of maleic anhydride and acetylene-dimethyl carboxylate.

References Cited by the Examiner

UNITED STATES PATENTS

| | | | |
|---|---|---|---|
| 2,414,028 | 1/1947 | Dietrich et al. | 260—2 |
| 2,756,239 | 7/1956 | Anderson | 260—2 |
| 2,757,146 | 7/1956 | Fawcett | 260—2 |
| 2,914,511 | 11/1959 | Errede et al. | 260—2 |
| 3,084,146 | 4/1963 | Errede et al. | 260—2 |

(Other references on following page)

FOREIGN PATENTS 806,014  12/1958  Great Britain.

OTHER REFERENCES

Mann et al.: Chemical Society Journal, pp. 2826–32 (1954).

Muller et al.: Chemische Berichte, vol. 90, pp. 543–53 (1957.)

Brown et al.: Nature, vol. 164, pp. 915-6 (1949).

Patterson et al.: "The Ring Index," p. 155, Reinhold Pub. Co., New York (1940).

Gardner, P. D. et al.: J.A.C.S., 81, 5515 (1959).

JOSEPH L. SCHOFER, *Primary Examiner*.

MILTON STERMAN, H. BURNSTEIN, LEON BERCOVITZ, *Examiners*.